United States Patent [19]

Briet

[11] Patent Number: 4,887,666
[45] Date of Patent: Dec. 19, 1989

[54] CONNECTION SYSTEM FOR INTERCONNECTING A HEAT EXCHANGER AND A PIPE UNION

[75] Inventor: Gilles Briet, Gueugnon, France
[73] Assignee: Hutchinson, France
[21] Appl. No.: 305,782
[22] Filed: Feb. 2, 1989

[30] Foreign Application Priority Data

Feb. 2, 1988 [FR] France ................................ 88 01189

[51] Int. Cl.⁴ ............................................. F28F 9/00
[52] U.S. Cl. ................................... 165/76; 165/178; 285/319; 285/921
[58] Field of Search ................ 165/76, 178, 173, 916; 285/319, 921

[56] References Cited

U.S. PATENT DOCUMENTS 2,468,848  3/1969  Trainor ........................... 285/319 X
3,245,703  3/1966  Manly .
4,665,972  5/1987  Potier ................................... 165/76

FOREIGN PATENT DOCUMENTS 208850  1/1987  European Pat. Off. .
2249299  5/1975  France .

Primary Examiner—Alan Cohan
Attorney, Agent, or Firm—Jacobs & Jacobs

[57] ABSTRACT

A connection system for interconnecting a heat exchanger and a pipe union, in which the pipe union (5) opens out into a connection tube (4) of a heat exchanger water box (3), with the pipe union being fixed to a flexible pipe (6) via a permanent connection and being fixed to the connection tube via an easily-released resilient connection. The resilient connection is constituted by a locking device comprising two diametrically opposite fingers (19) carried by a ring (18) fixed inside the water box (3) and disposed coaxially with the connection tube (4). The fingers (19) slope towards the axis of the connection tube and they are resilient in the radial direction, with two notches (22) being provided in the leading end (7) of the pipe union (5) in order to receive the locking resilient fingers (19) by snap-fastening when the pipe union (5) is engaged in the connection tube (4). The invention is applicable to providing rapid connections in the automobile industry.

1 Claim, 1 Drawing Sheet

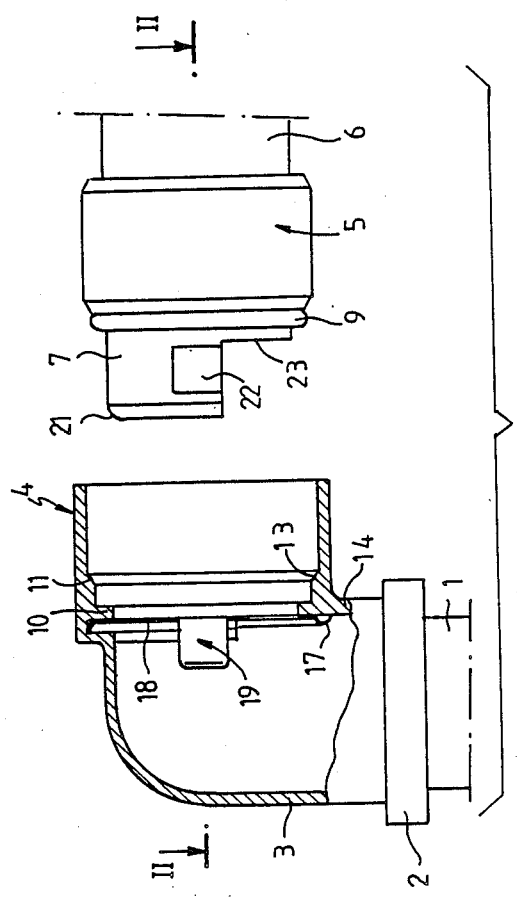
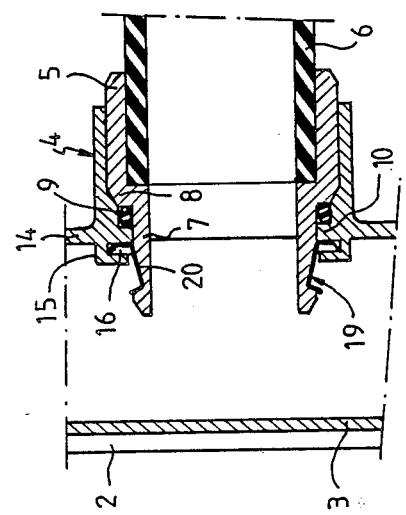

CONNECTION SYSTEM FOR INTERCONNECTING A HEAT EXCHANGER AND A PIPE UNION

The present invention which was made with the participation of VALEO Corporation relates to a connection system for interconnecting a heat exchanger and a pipe union, in which the pipe union opens out into a connection tube of a water box of the heat exchanger to which it is connected by means of an easily-released resilient connection.

BACKGROUND OF THE INVENTION

This connection system is intended to facilitate rapid connection and disconnection and is distinguished from similar prior art connection systems in that the locking and unlocking system is designed in the present system in such a manner as to make the connection system particularly simple and cheap compared with the complex systems of the prior art which are based either on using several components, or else on a complicated configuration for the pipe union and the connection tube used in making the connection.

SUMMARY OF THE INVENTION

The present invention provides a connection system for interconnecting a heat exchanger and a pipe union, in which the pipe union which opens out into a connection tube of the water box of the heat exchanger is fixed on a permanent basis to a flexible pipe and is releasably fixed to the connection tube via an easily-released resilient connection, with sealing between the pipe union and the connection tube being by an elastomer ring interposed therebetween, said resilient connection being constituted by a locking device comprising fingers carried by a ring which is received inside the water box coaxially with the connection tube, said fingers being directed towards the axis of said connection tube and being radially resilient, notches being provided in the leading end of the pipe union for receiving the resilient locking fingers by snap-fastening when the pipe union is assembled with the connection tube, said connection system including the improvement whereby said ring which is permanently fixed inside the water box is received in part in a substantially semicircular groove formed in a portion of the inside wall of the water box from which said connection tube projects, and bears as a force-fit against a swelling which is diametrically aligned with the same groove and which is disposed in a facing and symmetrical position about the location of said groove, with the leading end of the pipe union having a portion of its periphery omitted, said omitted portion extending between the locations of said notches and over an axial length which is slightly greater than the width of the notches, there being two of said locking fingers disposed at opposite ends of a diameter perpendicular to the diameter of symmetry of said groove.

In addition to the dispositions specified above, the invention provides further dispositions which appear from the following description.

BRIEF DESCRIPTION OF THE DRAWING

An embodiment of the invention is described by way of example with reference to the accompanying drawing, in which:

FIG. 1 shows a pipe union and a connection tube of a heat exchanger water box while they are disassembled, with the resilient locking device of the invention being located inside the connection tube; and FIG. 2 is a section on plane II through the connection tube and the pipe union of FIG. 1 when assembled together.

Naturally, it should be understood that the figures and the corresponding description are given purely by way of example and the invention is not limited specifically thereto.

MORE DETAILED DESCRIPTION

The bundle of heat exchanger tubes of a heat exchanger is designated schematically in FIG. 1 under the reference 1.

Reference 2 designates the perforated plate which interconnects the heat exchanger tubes and which connects them to the water box 3 which is provided with a connection tube 4 enabling the water box to be connected to a pipe union 5 made of plastic material and fixed to a flexible pipe 6, in particular of the so-called "Durit" type, made of an elastomer-based material.

The leading end 7 of the pipe union 5 projects from a radially inwardly directed annular shoulder 8 (see FIG. 2) with the shoulder serving to receive an elastomer sealing ring 9 which is disposed between the shoulder 8 and a radially inwardly projecting annular shoulder 10 inside the water box 3, thereby compressing the sealing ring radially between the connection tube and the pipe union when these two connection system portions are connected together (see FIG. 2). The shoulder 10 is in line with the wall 14 of the water box 3 from which the connection tube 4 projects. This tube has a second shoulder 11 with a sloping approach surface 13 for pressing against a similarly sloping approach surface 12 of the shoulder 8 on the pipe union (see FIG. 2). During assembly, the leading end 7 of the pipe union 5 slides over the shoulder 10 of the connection tube 4.

The shoulder 10 of the water box 3 has a thickening 15 extending axially relative to the connection tube (see FIG. 2), and projecting into the water box. This thickening extends over half of a circumference, which half-circumference may be extended a little by tangential portions.

A groove 16 is formed inside this thickening of the shoulder 10.

The shoulder 10 also has a swelling 17 (see FIG. 1) which also projects into the water box like the thickening 15, with the swelling being in radial alignment with the thickening and preferably being situated symmetrical relative thereto.

The function of the groove 16 and the swelling 17 is described below when describing the locking device in accordance with the invention.

This device is constituted by a ring 18 preferably made of metal, which includes two fingers 19 which are resilient in the radial direction and which slope towards the axis of the connection tube so that their approach surfaces 20 engage the leading end 7 of the pipe union 5 (which leading end 7 has a sloping approach surface 21), thereby moving the fingers 19 radially outwardly when the leading end of the pipe union penetrates into the connection tube.

The ring 18 is held in position by mounting the ring (prior to assembling the connection tube and the pipe union) in the above-mentioned groove 16 which is provided in the thickening 15 of the shoulder 10 in the connection tube, and by causing it to bear with force against the retaining swelling 17 which is also carried by the shoulder 10.

The leading end 7 of the pipe union 5 includes two notches 22 corresponding to the locations of the fingers 19 and having the same profiles as the fingers. The peripheral extent of said leading end corresponds to the peripheral extent of the thickening 15 of the shoulder 10, i.e. of the groove 16, and the remaining portion 23 thereof is omitted. The axial extent of said leading end is slightly greater than that of the locking fingers 19.

When the leading end 7 is inserted into the connection tube 4, the approach surface 21 of said leading end 7 engages the fingers 19 and urges them radially outwardly, thereby enabling the fingers to be received in the notches 22 of the pipe union once it is pushed fully home into the connection tube.

In order to unlock the assembly, the pipe union 5 should be rotated so as to disengage the resilient locking fingers 19 from their seats, i.e. from the notches 22.

Locking and unlocking operations may be marked by placing appropriate marks on the connection tube and on the pipe union, e.g. as described in the co-pending patent applications filed on the same day as the present application by the same Assignee and related to similar connection systems.

As can be seen from the above, the invention is not limited in any way to the particular embodiment and application described in detail. On the contrary, it extends to any variant that may occur to the person skilled in the art without going beyond the scope of the accompanying claims. In particular, although the pipe union made of plastic material is shown as being fixed to the flexible pipe made of elastomer by bonding due to molding the pipe union directly onto the pipe, this fixing could naturally be obtained by imprisoning the end of the pipe between the pipe union and an overmolded ring of plastic material, or by clamping using a metal collar placed around the pipe, or by gluing, or by any other equivalent means.

I claim:

1. A connection system for interconnecting a heat exchanger and a pipe union, in which the pipe union which opens out into a connection tube of the water box of the heat exchanger is fixed on a permanent basis to a flexible pipe and is releasably fixed to the connection tube via an easily released resilient connection, with sealing between the pipe union and the connection tube being by an elastomer ring interposed therebetween, said resilient connection being constituted by a locking device comprising fingers carried by a ring which is received inside the water box coaxially with the connection tube, said fingers being directed towards the axis of said connection tube and being radially resilient, notches being provided in the leading end of the pipe union for receiving the resilient locking fingers by snap-fastening when the pipe union is assembled with the connection tube, said connection system including the improvement whereby said ring which is permanently fixed inside the water box is received in part in a substantially semi-circular groove formed in a portion of the inside wall of the water box from which said connection tube projects, and bears as a force-fit against a swelling which is diametrically aligned with the same groove and which is disposed in a facing and symmetrical position about the location of said groove, with the leading end of the pipe union having a portion of its periphery omitted, said omitted portion extending between the locations of said notches and extending over an axial length which is slightly greater than the width of the notches, there being two of said locking fingers disposed at opposite ends of a diameter perpendicular to the diameter of symmetry of said groove.

* * * * *